US008572707B2

(12) United States Patent
Tuchman et al.

(10) Patent No.: US 8,572,707 B2
(45) Date of Patent: Oct. 29, 2013

(54) MULTIPLE AUTHENTICATION MECHANISMS FOR ACCESSING SERVICE CENTER SUPPORTING A VARIETY OF PRODUCTS

(75) Inventors: Kenneth D. Tuchman, Englewood, CO (US); Bruce A. Sharpe, Aurora, CO (US); Henry D. Truong, Chelmsford, MA (US)

(73) Assignee: TeleTech Holdings, Inc., Englewood, CO (US)

( * ) Notice: Subject to any disclaimer, the term of this patent is extended or adjusted under 35 U.S.C. 154(b) by 132 days.

(21) Appl. No.: 13/213,000

(22) Filed: Aug. 18, 2011

(65) Prior Publication Data
US 2013/0047232 A1    Feb. 21, 2013

(51) Int. Cl.
*H04L 9/32*    (2006.01)
*H04K 1/00*    (2006.01)
*G06F 7/04*    (2006.01)

(52) U.S. Cl.
USPC ........ 726/7; 726/2; 726/4; 713/168; 713/182; 713/186

(58) Field of Classification Search
USPC ............. 726/2–7; 713/168, 182, 186; 705/44, 705/64, 67, 76, 304
See application file for complete search history.

(56) References Cited

U.S. PATENT DOCUMENTS

| | | |
|---|---|---|
| 6,212,178 B1 | 4/2001 | Beck et al. |
| 6,226,623 B1 | 5/2001 | Schein et al. |
| 6,690,788 B1 | 2/2004 | Bauer et al. |
| 6,819,759 B1 | 11/2004 | Khuc et al. |
| 6,934,381 B1 | 8/2005 | Klein et al. |
| 6,934,849 B2 * | 8/2005 | Kramer et al. ................. 713/186 |
| 6,988,126 B2 | 1/2006 | Wilcock et al. |
| 7,165,213 B1 | 1/2007 | Busey |
| 7,418,092 B2 | 8/2008 | Brown |
| 7,450,567 B1 | 11/2008 | Mamnani |
| 7,496,053 B1 | 2/2009 | Seabaugh et al. |
| 7,558,382 B2 | 7/2009 | Torres et al. |
| 7,658,327 B2 | 2/2010 | Tuchman et al. |
| 7,746,362 B2 | 6/2010 | Busey et al. |

(Continued)

OTHER PUBLICATIONS

R. Ricci et al, SecurePhone: a mobile phone with biometric authentication and e-signature support for dealing secure transactions on the fly, pp. 1-11, Proc. of SPIE, 2006.*

(Continued)

*Primary Examiner* — Philip Chea
*Assistant Examiner* — Shanto M Abedin
(74) *Attorney, Agent, or Firm* — Blakely Sokoloff Taylor & Zafman LLP

(57) ABSTRACT

A service center receives first media data from a mobile device over a network, the first media data including at least one of an image and a voice stream presenting an identity of a user associated with the mobile device. The first media data was captured via at least one of a camera and a voice recorder of the mobile device. The user is authenticated by matching the first media data against second media data stored in the service center. The second media data has been previously registered with the service center, where the service center provides support services for a plurality of products on behalf of a plurality of product providers. Upon having successfully authenticated the user, support services are provided to the user for a product that has been registered with the service center by the user on behalf of a vendor.

18 Claims, 10 Drawing Sheets

(56) References Cited

U.S. PATENT DOCUMENTS

| | | |
|---|---|---|
| 7,761,321 B2 | 7/2010 | Kannan et al. |
| 7,787,609 B1 | 8/2010 | Flockhart et al. |
| 7,797,164 B2 * | 9/2010 | Junger et al. ............... 705/304 |
| 2002/0010724 A1 | 1/2002 | Sterling et al. |
| 2003/0163739 A1 | 8/2003 | Armington et al. |
| 2004/0199413 A1 * | 10/2004 | Hauser et al. ............... 705/7 |
| 2005/0138063 A1 * | 6/2005 | Bazot et al. ............... 707/102 |
| 2005/0273866 A1 | 12/2005 | Brown et al. |
| 2006/0011728 A1 | 1/2006 | Frantz et al. |
| 2006/0069922 A1 * | 3/2006 | Jelinek et al. ............... 713/186 |
| 2006/0158307 A1 | 7/2006 | Lee et al. |
| 2006/0171402 A1 | 8/2006 | Moore et al. |
| 2006/0218061 A1 | 9/2006 | Mouline |
| 2007/0041523 A1 | 2/2007 | Paden et al. |
| 2007/0094717 A1 * | 4/2007 | Srinivasan et al. ............... 726/5 |
| 2007/0136792 A1 * | 6/2007 | Ting et al. ............... 726/5 |
| 2007/0160188 A1 | 7/2007 | Sharpe et al. |
| 2007/0276722 A1 | 11/2007 | Silvera et al. |
| 2007/0293200 A1 | 12/2007 | Roundtree et al. |
| 2008/0046366 A1 * | 2/2008 | Bemmel et al. ............... 705/44 |
| 2008/0074264 A1 | 3/2008 | Sharpe et al. |
| 2008/0140438 A1 | 6/2008 | Bares |
| 2008/0195659 A1 | 8/2008 | Rawle |
| 2009/0072946 A1 * | 3/2009 | von Reischach et al. ...... 340/5.8 |
| 2009/0163175 A1 | 6/2009 | Shi et al. |
| 2009/0271621 A1 | 10/2009 | Mendelovich et al. |
| 2009/0307139 A1 * | 12/2009 | Mardikar et al. ............... 705/67 |
| 2009/0313129 A1 * | 12/2009 | Rothschild ............... 705/17 |
| 2009/0327131 A1 * | 12/2009 | Beenau et al. ............... 705/44 |
| 2010/0030881 A1 | 2/2010 | Moreira Sa de Souza et al. |
| 2010/0205540 A1 | 8/2010 | Gupta et al. |
| 2010/0316213 A1 | 12/2010 | Goel et al. |
| 2011/0047605 A1 * | 2/2011 | Sontag et al. ............... 726/7 |
| 2011/0265172 A1 * | 10/2011 | Sharma et al. ............... 726/8 |
| 2012/0140993 A1 * | 6/2012 | Bruso et al. ............... 382/118 |

OTHER PUBLICATIONS

N. L. Clarke et al, Advanced user authentication for mobile devices, Computing & Security 26 (2007) pp. 109-119, Elsevier Ltd, 2006.*

"Afaria OneTouch" iAnywhere Solutions, Inc., Dublin, California, 2005, 2 pages.

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

International Search Report and Written Opinion mailed Oct. 22, 2012, for International Application No. PCT/US2012/051309, 14 pages.

* cited by examiner

MULTIPLE AUTHENTICATION MECHANISMS FOR ACCESSING SERVICE CENTER SUPPORTING A VARIETY OF PRODUCTS

FIELD OF THE INVENTION

Embodiments of the present invention relate generally to providing product services. More particularly, embodiments of the invention relate to providing multiple authentication options for authenticating a user to access a service center.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PTSN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls.

As the Internet is getting more popular, customer service providers now provide for computer-based customer service interaction by way of the World Wide Web. Instead of initiating a customer service session by using the phone, customers may access a website and engage in a web-based customer service session to make inquiries (e.g., technical support) and/or perform tasks (e.g., paying bills). Web-based customer service sessions offer numerous advantages over teleconference-based sessions. For example, the graphical user interface of web-based customer service applications permit customers to view illustrations or written explanations and thus ameliorate the miscommunications which may arise with oral conversations between a customer service agent and a customer.

Further, web-based customer service sessions enable a customer to directly target his/her needs on the website and thus reduce the time expended both in navigating through a series of vocal menu choices inapplicable to the consumer's particular needs and in waiting to speak to a service agent. Significantly, web-based customer service sessions are particularly cost-effective for the customer service provider given that fewer agents are required to communicate with customers. Indeed, customers are provided functionality for finding answers to their questions or performing tasks without any help from a live agent. These customer service sessions may be entirely computer-based or, alternatively, involve interaction with a customer service agent.

In addition, in order to access a support center, a user is required to enter certain credentials such as username and password to allow the support center authenticating the user. As mobile devices are getting more popular, such an authentication mechanism becomes inconvenient as a mobile device may lack a user-friendly keyboard. There has been a lack of alternative authentication options available to a mobile device for accessing a support center.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
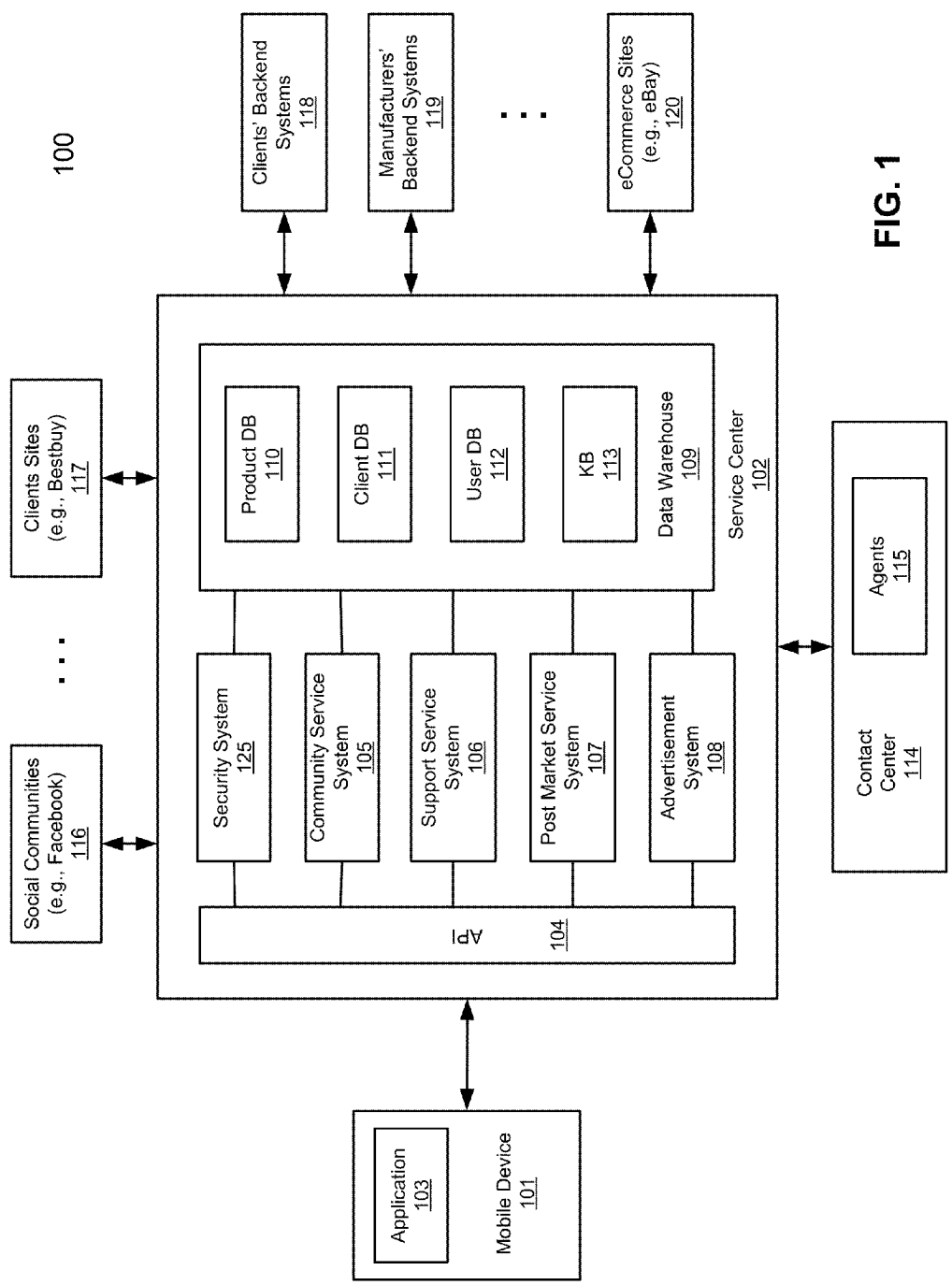
FIG. 1 is a block diagram illustrating a system for providing life cycle services to products according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, various login and authentication options are provided to a mobile device to allow a user to select one or more of the options to access a service center (e.g., a support center) that provides support services to a variety of products or services on behalf of a variety of product or service providers. The login/authentication options include, but are not limited to, a traditional username and password login/authentication option, a voice login/authentication option, and an image login/authentication option. These options can be utilized individually or in combination dependent upon a particular user configuration or preference, which may be specified and stored in a user profile maintained by the service center. One login/authentication option can be utilized in addition to another login/authentication option or alternatively, one login/authentication option can be utilized as a backup option when another login/authentication option fails.

In one embodiment, in response to a user selection of a voice login option, the mobile device presents predefined one or more terms, phrases, or sentences and requests the user to speak the presented content to a microphone of the mobile device. A voice recorder of the mobile device is configured to capture a voice stream representing the one or more phrases spoken in real time by the user. The mobile device then transmits the captured voice stream to the service center over a network. In response, a security system of the service center is configured to authenticate the user by matching the received voice stream against another voice stream that has been previously registered and stored in a database associated with the user of the service center.

Similarly, a user can also initiate an image or video login option from its mobile device. According to one embodiment, in response to a user selection of an image login option, the mobile device requests the user to capture one or more images of the user at the point in time using a camera of the mobile device. The mobile device then transmits the captured image(s) to the service center over a network. In response, a security system of the service center is configured to authenticate the user by matching the received image(s) against other image(s) that have been previously registered and stored in a database associated with the user of the service center.

According to one embodiment, the voice login option and the image/video login option may be required independently or in combination dependent upon specific situations, which may be configurable by the user and stored in a user profile of the service center. For example, a voice or image authentication may be required in addition to the traditional password authentication. Any of the voice, image, and password authentications may be selected as a default or primary authentication mechanism. If the default authentication fails, another authentication may be utilized as a backup login option.

Once the service center has successfully authenticated the user, the user can obtain support services or access resources available from the service center regarding one or more products or services that have been registered by the user. For example, a user can initiate from its mobile device and the service center can arrange a service specialist by establishing a communications session between the user and the service specialist using a communications channel that is preferred by the user and available to the service specialist. A user can also sell or dispose a registered product via the service center. A user can also access an online discussion forum associated with a registered product via the service center. A user can also receive certain advertisements (e.g., promotions or discount coupons) related to a registered product via the service center.

FIG. 1 is a block diagram illustrating a system for providing life cycle services to products according to one embodiment of the invention. Referring to FIG. 1, system 100 includes a mobile device 101 of a user, customer, or individual communicatively coupled to service center 102 over a network. The network may be any kind of networks. Mobile device 101 may be any kind of mobile devices including, but is not limited to, a laptop, mobile phone, tablet, media player, personal digital assistant or PDA, etc.

Service center 102 may be implemented in a centralized facility or server. Alternatively, service center 102 may be implemented in multiple facilities or servers in a distributed manner (e.g., cloud-based service platforms). Service center 102 provides services to a variety of products or services from a variety of clients or vendors. A client may be a manufacturer, a distributor, a retailer, a service provider or broker, a purchasing facility (e.g., Amazon™, Expedia™, or ISIS™), or a combination thereof. In one embodiment, service center 102 includes service APIs 104 to communicate with other systems such as mobile device 101, client's site 117, social communities 116, contact center 114 including agents or experts 115, client backend systems 118, manufacturer backend systems 119, eCommerce sites 120 and other auxiliary systems (e.g., billing system). Service center 102 can handle service requests from customers of multiple clients. For example, a service center may handle customer service requests for a number of retail sales companies, sales calls for catalog sales companies, and patient follow-up contacts for health care providers. In such a structure, the service center may receive service requests directly from the customers or through client support management systems.

In one embodiment, service center 102 further includes community service system 105, support services system 106, post market service system 107, messaging system 108, and data warehouse 109. Support services system 106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application. Further detailed information concerning service center 102 and/or support service system 106 can be found in co-pending U.S. patent application Ser. No. 13/085,397, filed Apr. 12, 2011, which is incorporated by reference in its entirety.

In one embodiment, community service system 105 is responsible for communicating with social communities 116 via an API, for example, to post a message received from a user and to route the responses received from social communities 116 back to the user. Post market service system 107 is responsible for handling post market activities associated with the registered products, including selling a registered product on eCommerce sites 120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, post market service system 107 of service center 102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Similarly, a user can also post a message to one or more of the registered social communities from the application running within the mobile device without having to individually access the social communities. In one embodiment, a user can transmit a request from mobile device 101 to service center 102, where the request includes a message to be posted and one or more community identifiers identifying one or more registered social communities. In response, community service system 105 of service center 102 is configured to retrieve the associated credentials from the database and to post the message to the specified social communities together with the associated credentials allowing the social communities to authenticate the user, without having to prompt the user for their same credentials each time. Further detailed information concerning community service system 105 and/or post market service system 107 can be found in co-pending U.S. patent application Ser. No. 13/185,213, filed Jul. 18, 2011, which is incorporated by reference herein in its entirety.

In one embodiment, messaging or advertisement system 108 is responsible for handling any messages received from a variety of partners or parties, such as client sites 117, client backend systems 118, manufacturer backend systems 119, and eCommerce sites 120. Messages may be related to the registered products of the user, such as, promotions, rewards, and recall messages. Messages may include advertisements from a variety of advertisement providers.

In one embodiment, a user can configure a set of one or more rules to specify whether certain types of messages or advertisements received from vendors or parties (e.g., retailers, manufacturers, social communities, or other advertisement providers), which may or may not be related to a registered product, should be routed to the user. These rules serve as part of message delivery or filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

According to another embodiment, an advertisement received from a vendor is delivered by the service center to a mobile device of a user based on a set of delivery rules associated with the user. The advertisement is displayed on a display of the mobile device by an application running therein. In addition, the service center and/or the application are configured to track interactions of the user with respect to the displayed advertisement to determine user behaviors, patterns, or trends in view of the displayed advertisement. An analysis is performed on the user interaction and the result of the analysis may be utilized to configure further advertisement delivery by the service center and/or the vendors.

According to another embodiment, service center 102 is configured to identify users that have at least one common product registered with the service center and are also members of a social community. The service center is configured to send a message to those users to invite them to connect (e.g., becoming friends or following a friend) with each other via the social community. The social community is hosted by a third party and communicatively coupled to the service center over a network. The service center may also deliver messages or items posted by one of those users to another one of those users on behalf of the social community, without requiring such users to individually or directly accessing the social community. The service center can also deliver messages or items to a particular user posted by other users of the social community, where the messages or items are related to a registered product of that particular user.

According to a further embodiment, an application running on a mobile device provides a user friendly graphical user interface (GUI) to allow a user to configure a set of one or more delivery rules concerning whether certain types of messages or advertisements should be received at the mobile device from a service center. The service center is configured to deliver messages or advertisements on behalf of a message or advertisement provider, which can be a client to the service center, a retailer, a manufacturer, a social community, or other content providers. A user can utilize the GUI to configure, for each of the providers, whether a message associated with a particular registered product of the user or all products in general related to the provider should be received by the mobile device. The settings of the delivery rules are then transmitted from the mobile device to the service center to allow the service center to delivery subsequent messages or advertisements on behalf of the message or advertisement providers accordingly. Further detailed information concerning advertisement system 108 can be found in co-pending U.S. patent application Ser. No. 13/185,309, filed Jul. 18, 2011, which is incorporated by reference herein in its entirety.

In one embodiment, data warehouse 109 includes product database 110, client database 111, user database 112, and knowledgebase 113. Product database 110 is configured to store any data related to the registered products including user manuals, etc. Client database 110 is configured to store information related to clients such as client's preferred communications mechanisms. User database 112 is used to store information related users, such as, for example, registered products associated with a user, communications channel preference of a user, credentials necessary for a user to access other sites, and/or messaging filtering settings of a user, etc. Knowledgebase 113 is used to store knowledge collected and compiled over a period of time, which can be used by agents 115 and/or users for self-support purposes.

In one embodiment, service center 102 further includes a multi-channel communication system (not shown) to provide one or more communication channels to any user or client to concurrently access service center 102. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication system may be fully or partially integrated with service center 102 or alternatively, it may be maintained or provided by a third party or partner (e.g., communicatively coupled via service API 104 over a network). Service center 102 further includes an automatic caller distribution (ACD) system (not shown) to receive, route, and manage voice calls exchanged via the multi-channel communication system.

A customer can obtain support services from service center 102 via a variety of communication mechanisms. A customer can initiate a support request to contact a live agent such as agents 115 in a live manner. Alternatively, a customer may browse certain knowledgebase, such as KB 113 via a Web interface, in an attempt to find a solution to a problem of a product he/she purchased from a manufacturer via a client of service center 102.

According to one embodiment, service center 102 further includes a security system 125 to authenticate a user of mobile device 101 in order to allow the user accessing services provided by any of systems 105-108. Security system 125 is configured to provide multiple login and authentication options to a mobile device to allow a user to select one or more of the options to access service center 102. The login/authentication options include, but are not limited to, a traditional username and password login/authentication option, a voice login/authentication option, and an image login/authentication option. These options can be utilized individually or in combination dependent upon a particular user configuration or preference, which may be specified and stored in a user profile maintained by service center 102, as part of user database 112. One login/authentication option can be utilized in addition to another login/authentication option or alternatively, one login/authentication option can be utilized as a backup option when another login/authentication option fails.

In one embodiment, in response to a user selection of a voice login option, security system 125 causes mobile device 101 to present predefined one or more phrases and to request the user to speak the presented content to a microphone of the mobile device. A voice recorder of mobile device 101 is configured to capture a voice stream representing the one or more phrases spoken in real time by the user. Mobile device 101 then transmits the captured voice stream to service center 102 over a network. In response, security system 125 is configured to authenticate the user by matching the received voice stream against another voice stream that has been previously registered and stored in a database associated with the user of the service center.

Similarly, a user can also initiate an image or video login option from its mobile device. According to one embodiment, in response to a user selection of an image login option, mobile device 101 requests the user to capture one or more images of the user at the point in time using a camera of mobile device 101. Mobile device 101 then transmits the captured image(s) to service center 102 over a network. In response, security system 125 of service center 102 is configured to authenticate the user by matching the received image(s) against other image(s) that have been previously registered and stored in a database associated with the user of the service center. The previously recorded voice and/or image references may be stored, for example, by a registration system (not shown), in a user account as part of user database 112. Once the service center has successfully authenticated the user, the user can obtain support services or access resources available from the service center as described above regarding one or more products or services that have been registered by the user.

According to one embodiment, application 103 is installed on mobile device 101 of a customer or user, where application 103 can serve as a central service point to service center 102 that provides support services to a variety of products or services provided by a variety of vendors. The vendors can be, for example, manufacturers, distributors, retailers, service brokers, purchasing houses, etc. of the products. Vendors may be the clients of service center 102 or entities having a business relationship with service center 102. A user (also referred to herein as a customer) can activate application 103 from the user's mobile device 101 to reach agents 105 the service center 102 or KB data center 114 via a variety of communication channels or media, such as, for example, email, chat, voice (including automated interactive voice recognition or IVR, voice over Internet protocol or VoIP), video, Web, and/or online community-based forum, etc. Application 103 can be a thin/thick client application or a Web-based application.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via services APIs of the service center, without a need of a real person involved. Such processing logic and/or functional blocks can be implemented in software, hardware, or a combination thereof.

Figure 2:
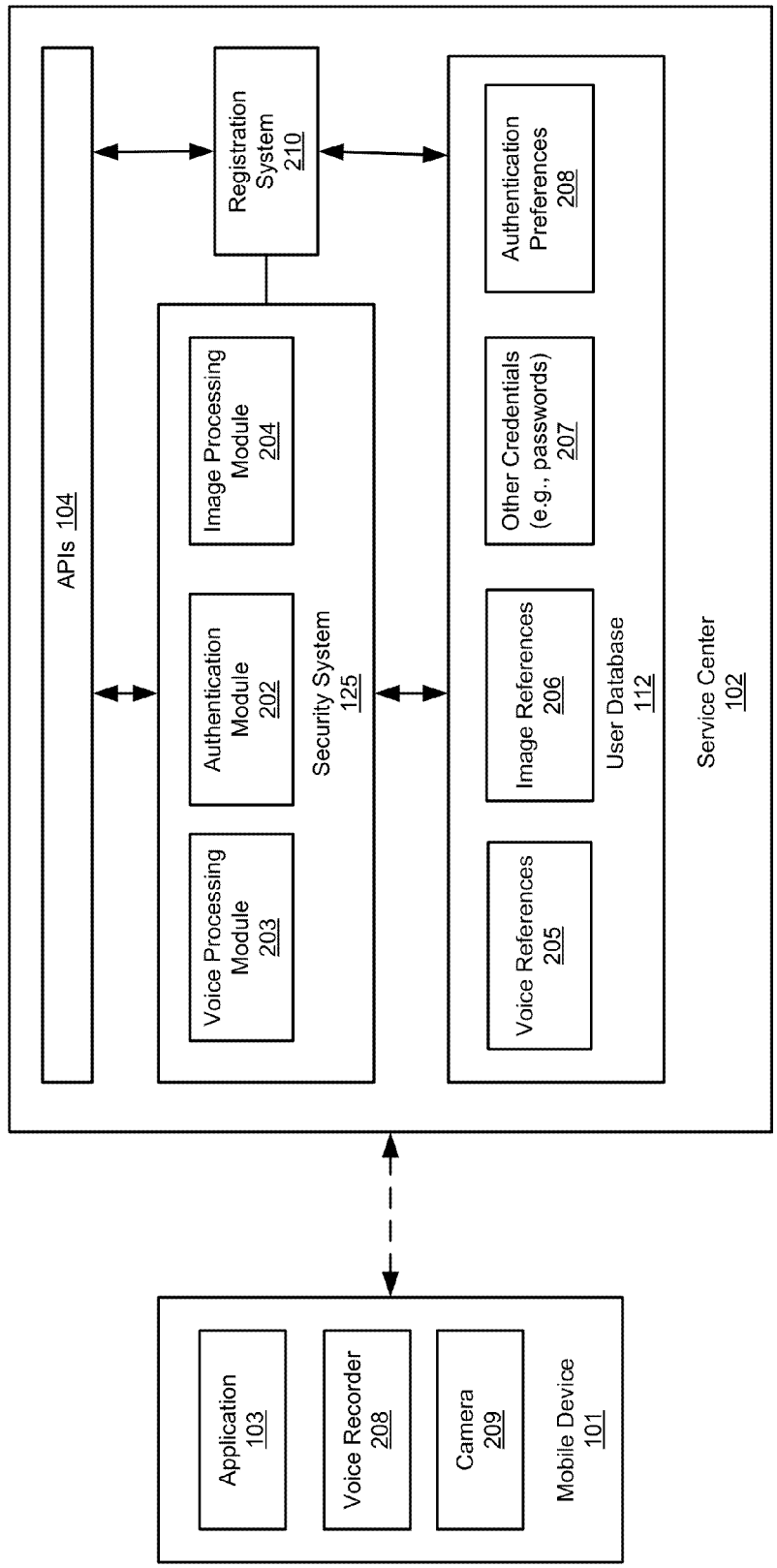
FIG. 2 is a block diagram illustrating an example of a service center according to another embodiment of the invention.

FIG. 2 is a block diagram illustrating a security of a service center according to one embodiment of the invention. System 200 may be implemented as part of system 100 of FIG. 1. Referring to FIG. 2, service center 102 includes API 104 to allow a client such as mobile device 101 to access service center 102, security system 125 to authenticate a user of mobile device 101, registration system 210 to register credentials for authentication, and user database 112 to store the authentication credentials. In one embodiment, security system 125 includes authentication module 202, voice processing module 203, and image processing module 204. Authentication module 202 can authenticate a user of mobile device 101 using various authentication methods, such as, for example, traditional password authentication, voice authentication, image or video authentication, or a combination thereof.

In one embodiment, in response to a user selection of a voice login option, mobile device 101 presents predefined one or more terms, phrases, or sentences and requests the user to speak the presented content to a microphone of mobile device 101. Voice recorder 208 of mobile device 101 is configured to capture a voice stream representing the one or more phrases spoken in real time by the user. Mobile device 101 then transmits the captured voice stream to service center 102 over a network. In response, authentication module 202 of security system 125 is configured to authenticate the user by matching the received voice stream against one of voice references 205 that have been previously registered by registration system 210 and stored in user database 112 associated with the user.

In one embodiment, authentication module 202 may invoke voice processing module 203 to process the received voice stream in view of voice references 205. Voice processing module 203 may be implemented as a part of a voice recognition system, which may be maintained by service center 102 or alternatively by a third party voice recognition system that is accessible (e.g., over a network) via an API. Voice references 205 may include multiple voice streams, each of which may be registered and trained previously by registration system 210. For example, during the registration, a user may be prompted by registration system 210 via application 103 to repeatedly speak to a microphone of mobile device 101 a predetermined phrase in real time. The predetermined phrase may be maintained by application 103 or retrieved from user database 112 of service center 102. Registration system 210 may invoke voice processing module 203 to process the captured phrases, and to train and capture voice characteristics of the user that can uniquely identify the user. The final voice reference is then stored in database 112 as part of voice references 205. Multiple voice references may be utilized during the training, any one or more of which can be used to authenticate the user dependent upon user configuration, which may be stored as part of authentication preferences 208. For example, if authentication module fails to authenticate the user based on a first voice reference, it may attempt to authenticate the user based on a second voice reference, or up to a predetermined number of voice references before declaring that the user cannot be authenticated.

Similarly, a user can also initiate an image or video login option from its mobile device 101. According to one embodiment, in response to a user selection of an image login option, mobile device 101 requests the user to capture one or more images or a video stream of the user at the point in time using camera 209 of mobile device 101. Mobile device 101 then transmits the captured image(s) or video stream to security system 125 of service center 102 over a network. In response, security system 125 is configured to authenticate the user by matching the received image(s) or video stream against image or video references that have been previously registered by registration system 210 and stored as part of image references 206 in database 112. Similarly, multiple image references can be utilized to authenticate a user.

According to one embodiment, the voice login option and the image/video login option may be required independently or in combination dependent upon specific situations, which may be configurable by the user and stored as part authentication preferences 208. For example, a voice or image authentication may be required in addition to the traditional password authentication, dependent upon the security level required. Any of the voice, image, and password authentications may be selected as a default or primary authentication mechanism. If the default authentication fails, another authentication mechanism may be utilized as a backup login option.

Once the service center has successfully authenticated the user, the user can obtain support services or access resources available from the service center regarding one or more products or services that have been registered by the user. For example, a user can initiate from its mobile device and the service center can arrange a service specialist by establishing a communications session between the user and the service specialist using a communications channel that is preferred by the user and available to the service specialist. A user can also sell or dispose a registered product via the service center. A user can also access an online discussion forum associated with a registered product via the service center. A user can also receive certain advertisements (e.g., promotions or discount coupons) related to a registered product via the service center. A registered product or service may be registered by scanning a machine-readable code (e.g., barcode, UPC, or serial number) of the product or service using a scanner or camera of the mobile device without requiring the user to provide detailed information of the product or service. Based on the scanned machine-readable code, registration system 210 can communicate with the necessary or related parties (e.g., systems 116-120 of FIG. 1) to compile the detailed information, as described in the above incorporated-by-reference applications.

Figure 3:
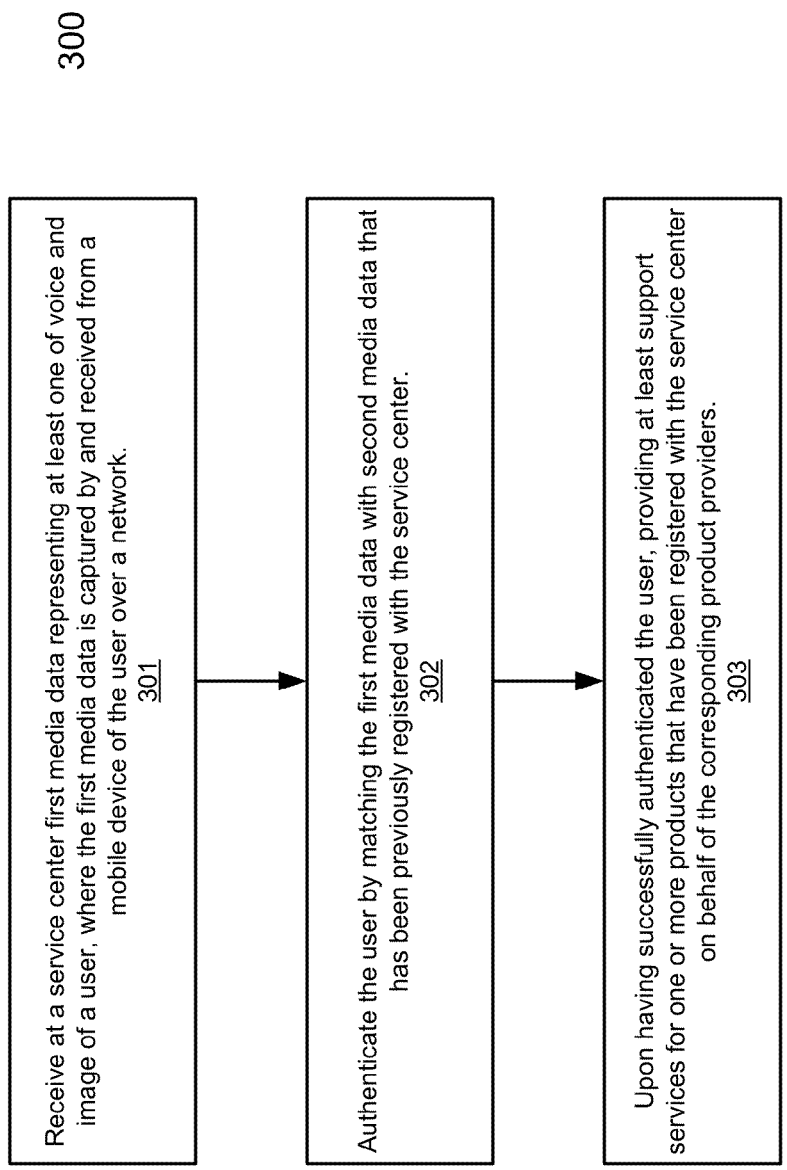
FIG. 3 is a flow diagram illustrating an authentication method for accessing a service center according to one embodiment of the invention.

FIG. 3 is a flow diagram illustrating an authentication method for accessing a service center according to one embodiment of the invention. For example, method 300 may be performed by service center 102 in FIGS. 1-2. Referring to FIG. 3, at block 301, first media data is received at a security system of a service center. The first media data represents at least one of voice and image of a user. The first media data was captured and received from a mobile device of the user over a network, for example, using a voice recorder and/or camera of a mobile device. In response to the first media data, at block 302, an authentication module is configured to authenticate the user based on the first media data. The authentication module may invoke a voice processing module and/or an image/video processing module to process the first media data by matching the first media data against second media data that has been previously registered with the service center. The second media data represents at least one of voice and image references and may be registered and trained using the techniques described above. Upon having successfully authenticated the user based on the first media data, at block 303, the service center is configured to provide support services, as described in the above incorporated-by-reference applications, for one or more registered products or services that have been registered with the service center on behalf of the corresponding product or service providers.

Figure 4:
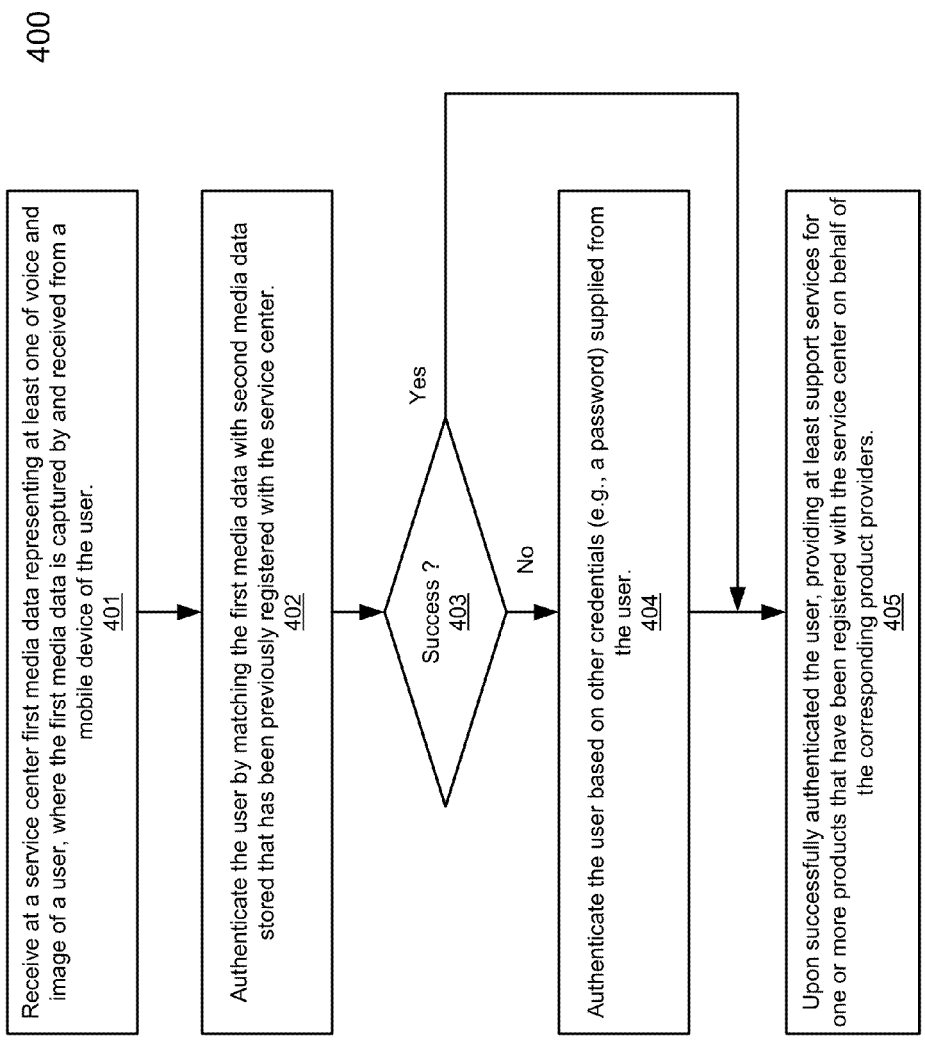
FIG. 4 is a flow diagram illustrating an authentication method for accessing a service center according to another embodiment of the invention.

FIG. 4 is a flow diagram illustrating an authentication method for accessing a service center according to another embodiment of the invention. For example, method 400 may be performed by service center 102 in FIGS. 1-2. Referring to FIG. 4, at block 401, first media data is received at a security system of a service center. The first media data represents at least one of voice and image of a user. The first media data was captured and received from a mobile device of the user over a network, for example, using a voice recorder and/or camera of the mobile device. In response to the first media data, at block 402, an authentication module is configured to authenticate the user based on the first media data. The authentication module may invoke a voice processing module and/or an image/video processing module to process the first media data by matching the first media data against second media data that has been previously registered with the service center. The second media data may be registered and trained using the techniques described above. At block 403, it is determined whether the authentication based on the first media data is successful. If so, at block 405, the service center is configured to provide support services, as described in the above incorporated-by-reference applications, for one or more registered products or services that have been registered with the service center on behalf of the corresponding product or service providers. If the authentication based on the first media data is not successful, at block 404, another authentication method such as traditional password authentication method is performed as an alternative authentication mechanism.

As described above, a user can configure, as a part of a user profile or authentication preferences, any one or more of the configured authentication methods can be used to authenticate a user. Alternatively, a particular authentication method (e.g., voice, image, or password) can be designated as a default or primary authentication method or alternatively, it can be configured as a secondary or backup authentication method. Furthermore, a particular authentication method can also be configured as an addition authentication method, in addition to a default or primary authentication dependent upon the security requirement. For example, according to one configuration, a user can select any one of voice, image, and password authentication methods to allow a service center to authenticate the user. Alternatively, according to another configuration, if a voice or image authentication fails, a traditional password authentication may be performed, or vice versa. According to a further configuration, if a default authentication such as voice or image authentication is successful, a traditional password authentication may further be required, or vice versa, for extra security consideration, etc. Other configurations may also be applied herein.

Figure 5:
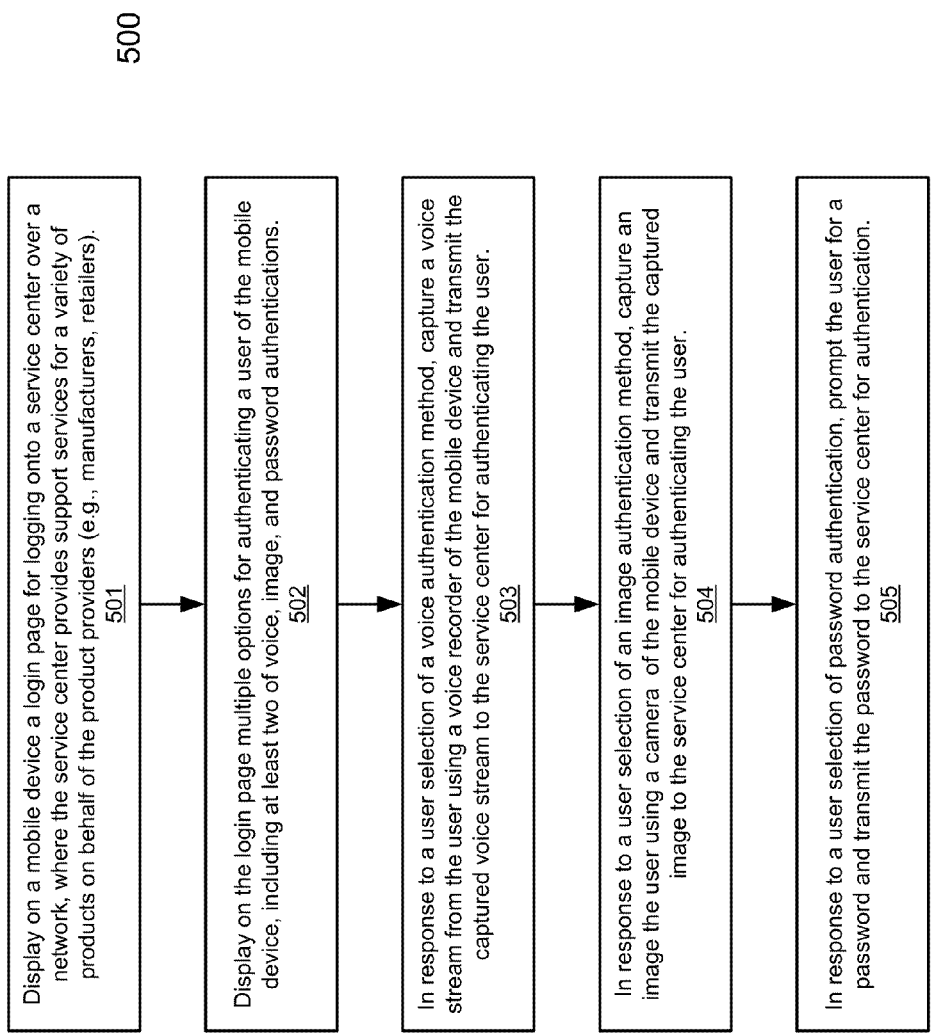
FIG. 5 is a flow diagram illustrating a method to authenticate a user for accessing a service center according to one embodiment of the invention.

FIG. 5 is a flow diagram illustrating a method to authenticate a user for accessing a service center according to one embodiment of the invention. For example, method 500 may be performed by mobile device 101 of FIGS. 1-2. Referring to FIG. 5, at block 501, processing logic displays a login page on a display of a mobile device for logging onto a service center over a network. The service center provides support services for a variety of products or services on behalf of a variety of product or service providers. At block 502, processing logic displays on the login page multiple authentication options for authenticating a user of the mobile device, including at least two of voice, image/video, and password authentication options. In response to a user selection of a voice authentication method, at block 503, processing logic instructs the user to speak a predetermined phrase to a microphone of the mobile device. Processing logic is configured to capture, via a voice recorder of the mobile device, a voice stream in real time and to transmit the captured voice stream to the service center over a network to enable the service center to authenticate the user based on the voice stream.

In response to a user selection of an image/video authentication method, at block 504, processing logic instructs the user to capture an image or video stream of the user at the point in time using a camera of the mobile device. Processing logic is configured to capture, via the camera of the mobile device, an image or video stream in real time and to transmit the captured image or video stream to the service center over a network to enable the service center to authenticate the user based on the image or video stream. In response to a user selection of a password authentication method, at block 505, processing logic prompts the user to enter a password in an input field displayed on the login page and transmits the password to the service center to allow the service center to authenticate the user based on the password.

Note that as described above, the voice, image/video, and password authentication methods may be presented and performed individually or in combination. Operations involved in blocks 503-505 may be performed independently or in sequence, dependent upon the specific configuration (e.g., authentication preferences) of the user. Similarly, the voice, image/video, and password login options may be presented on the login page individually or in combination dependent upon the authentication preferences of the user. For example, it is assumed that a user has configured his/her authentication preferences to have a voice login as a primary authentication method and a password authentication as a secondary authentication. In this example, the login page may only display a voice login option and only if the voice authentication fails, the login page then prompts the user for password. Similarly, if the user has configured requiring both image and password authentication methods, where the image authentication method is a default one, the login page may display only the image login option first and only if the image authentication is successful, the login page then displays the password login option requesting the user to enter the password. Other configurations may exist.

Figure 6B:
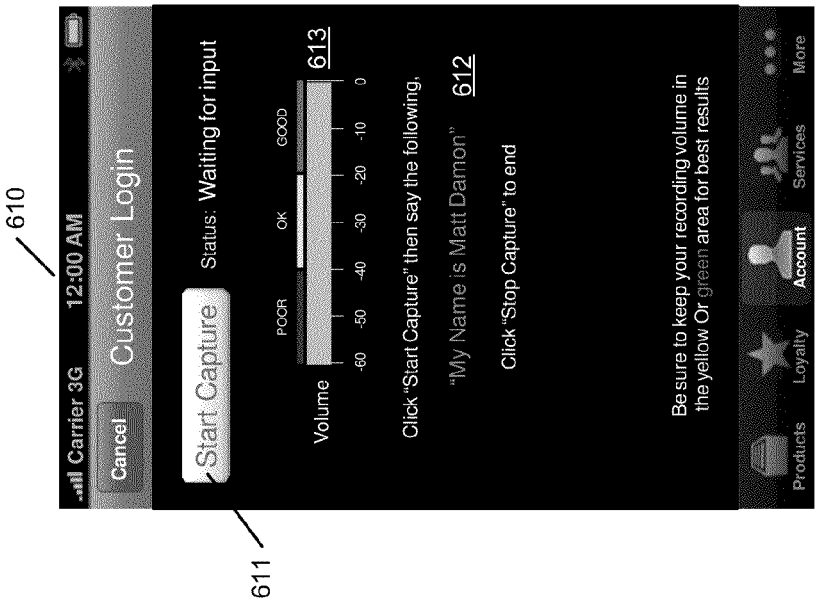
FIGS. 6A-6F are screenshots illustrating examples of graphical user interfaces (GUIs) for authenticating a user for accessing a service center according to one embodiment of the invention.
Figure 6A:
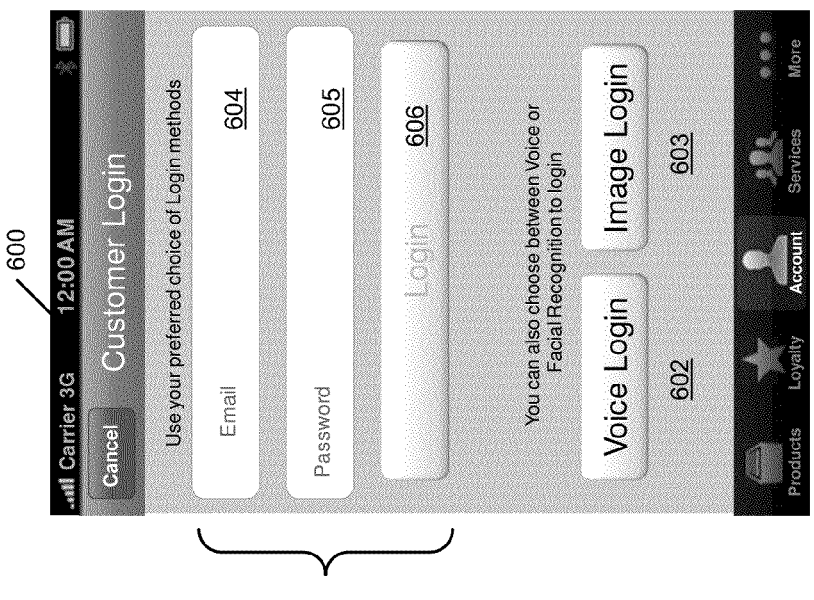

FIGS. 6A-6F are screenshots illustrating examples of graphical user interfaces (GUIs) for authenticating a user for accessing a service center according to one embodiment of the invention. For example, the GUIs as shown in FIGS. 6A-6F may be presented by application 103 of mobile device 101. Referring to FIG. 6A, when a user launches application 103 from its mobile device and attempts to log into service center 102 over a network, login page 600 is presented by the application. As described above, embodiments of the invention provide a variety of login options to allow a user to log into the service center using one or more of the login options, dependent upon the specific configuration of the authentication preferences. In this example, login page 600 includes three login options: 1) traditional password login option 601; 2) voice login option 602; and 3) image login option.

Again, the login options are presented on login page 600 dependent upon the specific configuration of the authentication settings, which may be stored as a part of authentication preferences or user profile. In this example, it is assumed that a user has configured to have all three options available and enabled, such that the user can utilize any one of the login options 601-603. In another example, the user may have configured to have only one or two of the login options 601-603 that are available for login. In such a situation, only the preferred or available login options are presented on login page 600. In a further example, a user may have designated a primary or default login option and a secondary or backup login option, where the secondary login option is utilized only when the primary login option fails to authenticate the user. In such a situation, only the primary login option is initially displayed on login page 600, where the secondary login option is displayed on login page 600 only when the primary login fails. Similarly, a user may have designated a primary or default login option and one or more secondary login options, where the secondary login option is utilized only when the primary login option successfully authenticates the user. In such a situation, only the primary login option is initially displayed on login page 600, where a secondary login option is displayed on login page 600 only when the primary login successfully authenticates the user.

Referring back to FIG. 6A, according to one embodiment, a user can select any one of login options 601-603 for logging onto the service center. If the user selects traditional password login option 601, the user can enter the necessary user identification (e.g., email address) in input field 604 and the password in input field 605. Once the user activates or clicks login button 606, the username and password are transmitted by the application to the service center over a network to allow the service center to authenticate the user based on the username and password. Alternatively, the user can select voice login or image login option by activating buttons 602 and 603, respectively.

According to one embodiment, when the user selects voice login option 602, a voice login page 610 is displayed as shown in FIG. 6B. Referring now to FIG. 6B, voice login page 610 includes information requesting the user to capture predetermined phrase 612 by activating button 611. The predetermined phrase 612 may be maintained by the underlying application or by the service center. In addition, voice login page 610 displays a volume indicator 613 indicating the current volume spoken by the user, which may be monitored by the underlying application. In this way, the user can adjust his/her volume to ensure that a reasonably good quality of a voice stream is captured for authentication purpose.

Figures 6C, 6D:
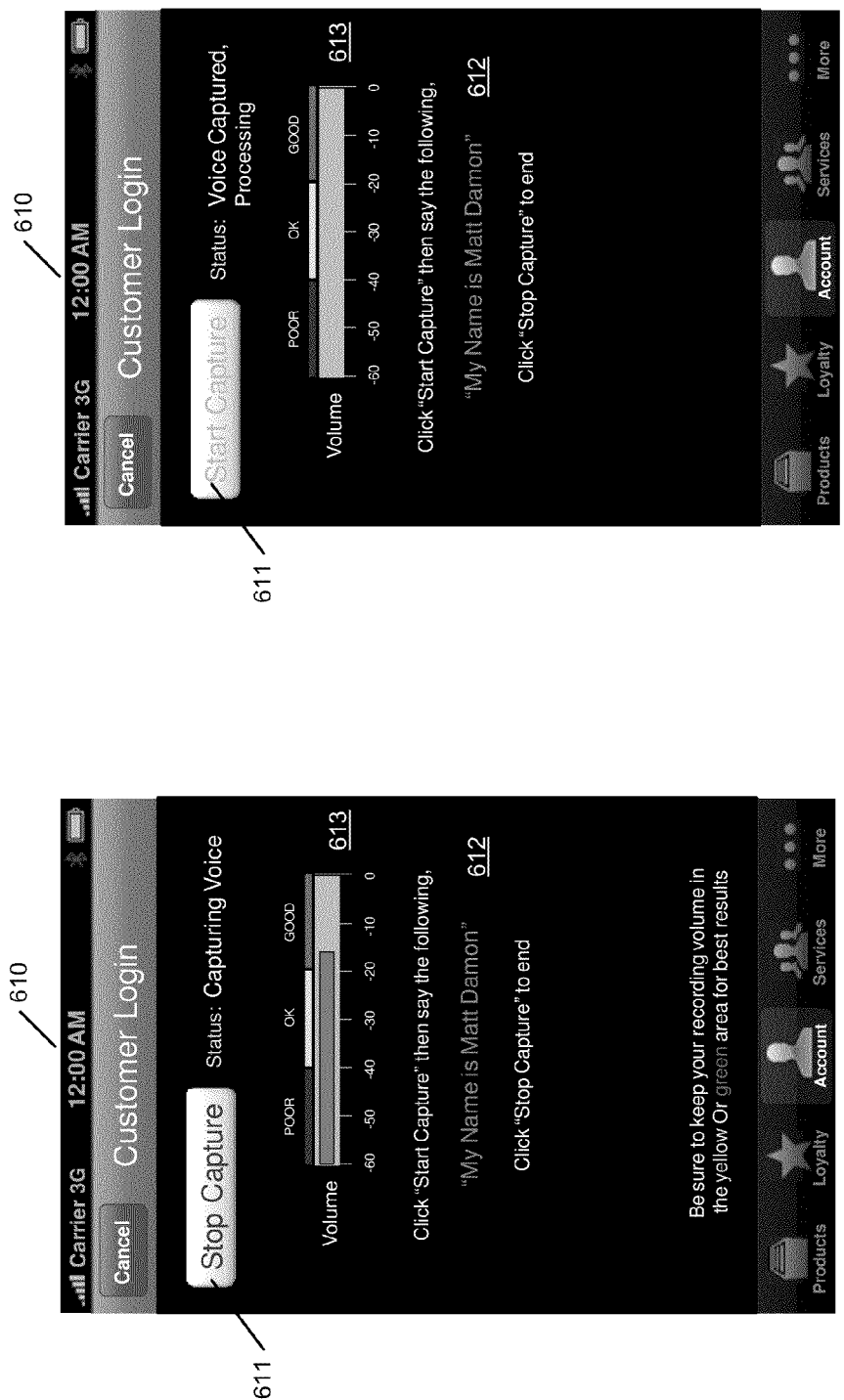
Figures 6E, 6F:
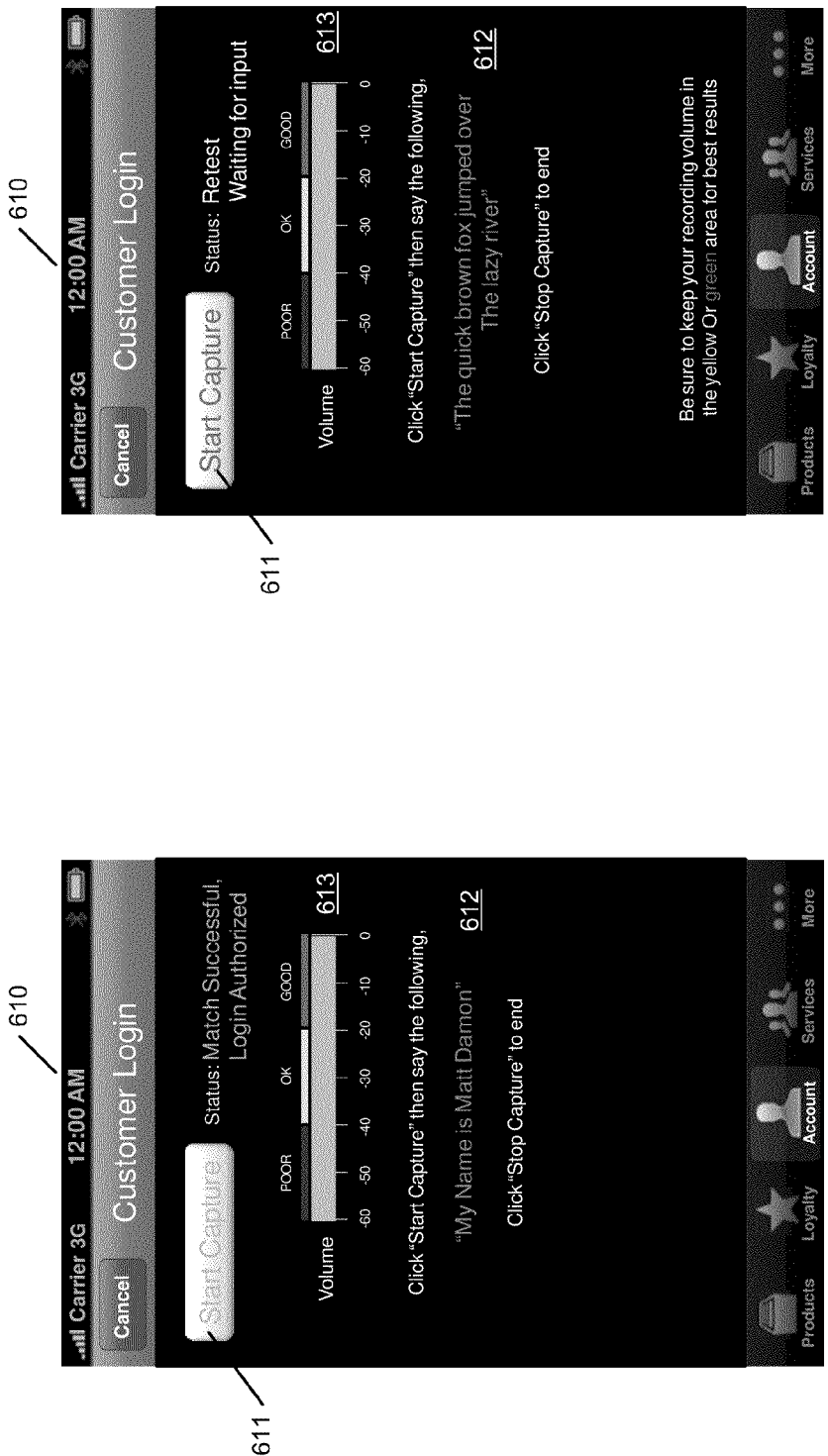

Once the user activates button 611, voice login page 611 displays information indicating that the voice of the user is being recorded as shown in FIG. 6C. In addition, volume indicator 613 may display in real time the current volume spoken by the user. At this point, the user can click button 611 again to stop the recording. Once the recording has been completed, the captured voice stream is transmitted to the service center and the voice login page displays information indicating that the user is being authenticated based on the voice as shown in FIG. 6D. Once the user has been successfully authenticated based on the voice as shown in FIG. 6E, the user can access resources of the service center including obtaining support services from the service center concerning one or more products or services that have been previously registered with the service center by the user. If the voice authentication fails, a failure message is displayed to allow the user to try another attempt, for example, using a different phrase as shown in FIG. 6F.

Figure 7B:
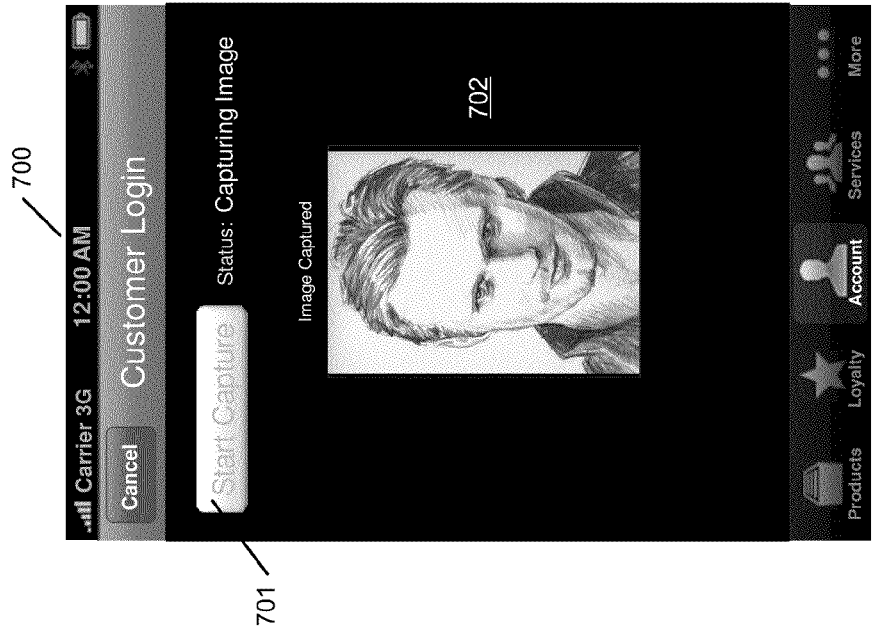
FIGS. 7A-7D are screenshots illustrating examples of graphical user interfaces (GUIs) for authenticating a user for accessing a service center according to another embodiment of the invention.
Figure 7A:
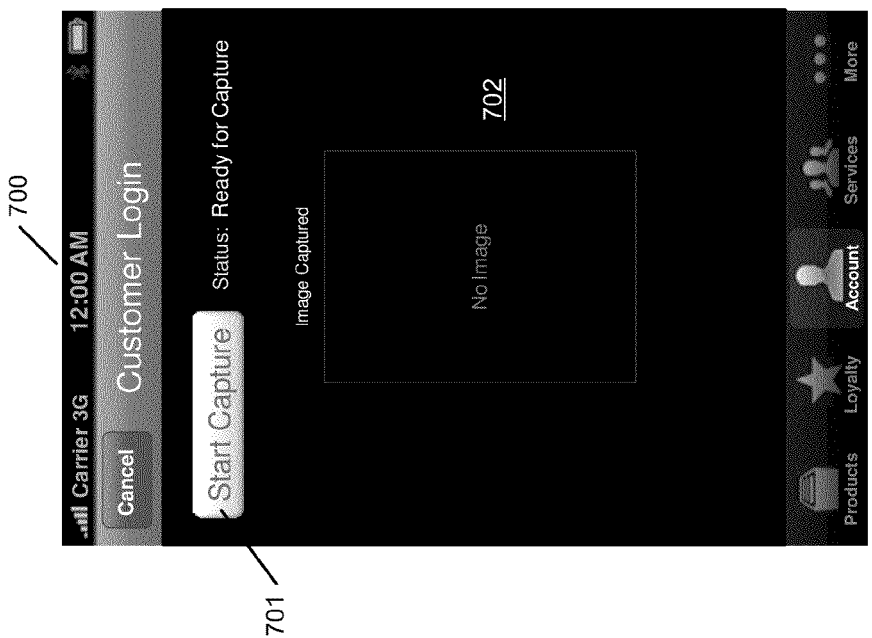
Figure 7D:
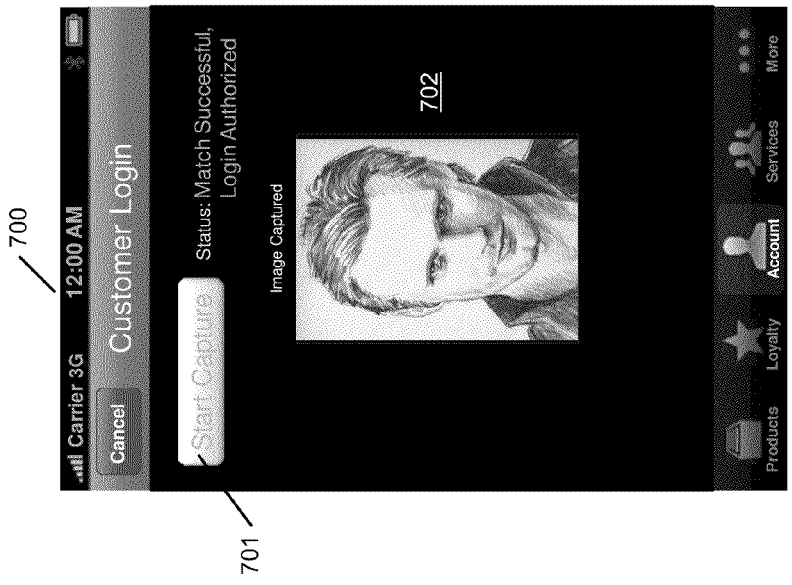
Figure 7C:
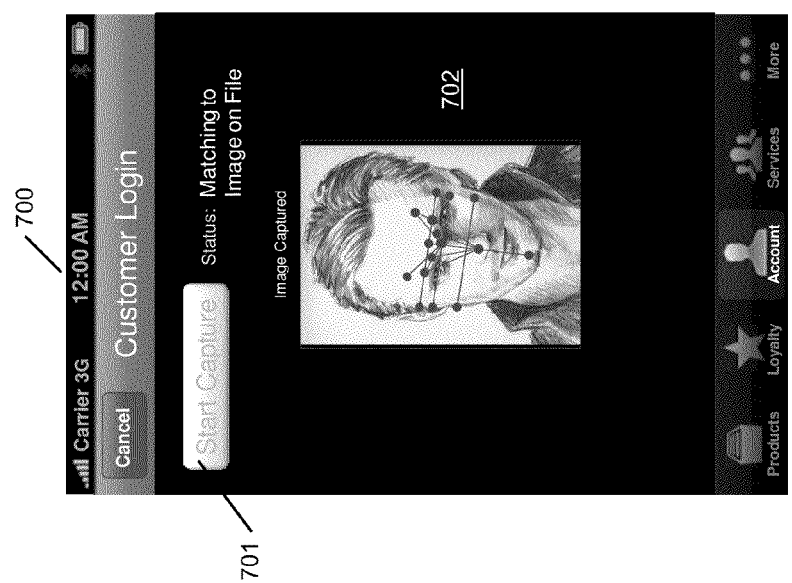

FIGS. 7A-7D are screenshots illustrating examples of graphical user interfaces (GUIs) for authenticating a user for accessing a service center according to another embodiment of the invention. For example, GUI pages as shown in FIGS. 7A-7D may be presented in response to an activation of button 603 of FIG. 6A for image login. In one embodiment, in response to a request for image login, image login page 700 is presented on a display of a mobile device. Image login page 700 includes button 701 to allow a user to start image login process by capturing an image of the user in real time as shown in FIG. 7B. The captured image is also displayed on display area 702 of image login page 700. Once the image has been captured, certain characteristics of the image may be determined and transmitted to the service center for authentication. In one embodiment, a facial recognition process is performed on the captured image as shown in FIG. 7C. Alternatively, at least a portion of the image is transmitted to the service center, where a facial recognition is performed at the service center. Once the service center has authenticated the user based on the image, the image login page 700 displays either successful or failure status of the authentication as shown in FIG. 7D.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing support services to users of products, the method comprising:

transmitting a plurality of login options for logging into a computer server representing a service center to a mobile device to be presented by a mobile application running within the mobile device, wherein the login options include a media login option using an image or a voice stream and a regular login option using a username and a password;

in response to the login options, receiving, at the computer server, first media data from a mobile device over a network, the first media data including at least one of an image and a voice stream representing an identity of a user associated with the mobile device, wherein the first media data was captured via at least one of a camera and a voice recorder of the mobile device;

authenticating the user by matching the first media data against second media data stored in the service center, wherein the second media data has been previously registered with the service center, wherein the service center provides support services for a plurality of products on behalf of a plurality of product providers, wherein a product provider is one of a retailer, a manufacturer, a distributor, and a service provider associated with the products;

upon having successfully authenticated the user, retrieving from a user account associated with the user one or more products that have been registered with the service center;

determining a list of support options available to the user for each of the registered products, wherein the availability of the support options are determined based on a support preference of a client of the corresponding registered product; and providing support services to the user for a product that has been purchased by the user and registered with the service center by the user, wherein providing support services to the user comprises establishing a communication session between the user via the mobile device and a support agent of the service center using a communications channel that is preferred by the user and is available to the agent, such that the support agent can provide a live support service to the user concerning the registered product.

2. The method of claim 1, further comprising:
causing the mobile device to prompt the user for entering a password; and
in response to the password received from the mobile device, authenticating the user based on the password.

3. The method of claim 2, wherein the authentication based on the password is performed only if the authentication based on the first media data fails.

4. The method of claim 2, wherein the authentication based on the password is performed only if the authentication based on the first media data is successful.

5. The method of claim 1, further comprising:
transmitting an instruction to the mobile device to prompt the user speaking one or more predetermined phrases to a microphone of the mobile device;
receiving a first voice stream captured by a voice recorder of the mobile device, the first voice stream representing the one or more predetermined phrases; and
authenticating the user by matching the first voice stream with a second voice stream that has been previously registered with the service center by the user.

6. The method of claim 1, wherein the product was registered by transmitting a machine readable code uniquely identifying the product from the mobile device to the service center, wherein the machine-readable code was obtained by scanning the product using a scanner of the mobile device, and wherein the service center is configured to compile the detailed information of the product without the user specifically providing detailed information of the product.

7. The method of claim 1, further comprising:
identifying one or more articles associated with the products that have been published in an online publication forum, wherein the articles have been extracted from a knowledgebase (KB) based on a support history of the products maintained by the service center; and
transmitting a personalized page to the mobile device to be displayed at a display of the mobile device, the personalized page listing the one or more registered products associated with the user, wherein each of the registered products is associated with one or more graphical representations, which when activated, transmits a support request to the service center for support services for the associated product.

8. A non-transitory machine-readable storage medium having instructions stored therein, which when executed by a processor, cause the processor to perform a method for providing support services to users of products, the method comprising:

transmitting a plurality of login options for logging into a computer server representing a service center to a mobile device to be presented by a mobile application running within the mobile device, wherein the login options include a media login option using an image or a voice stream and a regular login option using a username and a password;

in response to the login options, receiving first media data from a mobile device over a network, the first media data including at least one of an image and a voice stream representing an identity of a user associated with the mobile device, wherein the first media data was captured via at least one of a camera and a voice recorder of the mobile device;

authenticating the user by matching the first media data against second media data stored in the service center, wherein the second media data has been previously registered with the service center, wherein the service center provides support services for a plurality of products on behalf of a plurality of product providers, wherein a product provider is one of a retailer, a manufacturer, a distributor, and a service provider associated with the products; and upon having successfully authenticated the user, retrieving from a user account associated with the user one or more products that have been registered with the service center;

determining a list of support options available to the user for each of the registered products, wherein the availability of the support options are determined based on a support preference of a client of the corresponding registered product; and providing support services to the user for a product that has been purchased by the user and registered with the service center by the user, wherein providing support services to the user comprises establishing a communication session between the user via the mobile device and a support agent of the service center using a communications channel that is preferred by the user and is available to the agent, such that the support agent can provide a live support service to the user concerning the registered product.

9. The machine-readable storage medium of claim 8, wherein the method further comprises:
causing the mobile device to prompt the user for entering a password; and
in response to the password received from the mobile device, authenticating the user based on the password.

10. The machine-readable storage medium of claim 9, wherein the authentication based on the password is performed only if the authentication based on the first media data fails.

11. The machine-readable storage medium of claim 9, wherein the authentication based on the password is performed only if the authentication based on the first media data is successful.

12. The machine-readable storage medium of claim 8, wherein the method further comprises:
transmitting an instruction to the mobile device to prompt the user speaking one or more predetermined phrases to a microphone of the mobile device;
receiving a first voice stream captured by a voice recorder of the mobile device, the first voice stream representing the one or more predetermined phrases; and
authenticating the user by matching the first voice stream with a second voice stream that has been previously registered with the service center by the user.

13. The machine-readable storage medium of claim 8, wherein the product was registered by transmitting a machine readable code uniquely identifying the product from the mobile device to the service center, wherein the machine-readable code was obtained by scanning the product using a scanner of the mobile device, and wherein the service center is configured to compile the detailed information of the product without the user specifically providing detailed information of the product.

14. The machine-readable storage medium of claim 8, further comprising:
- identifying one or more articles associated with the products that have been published in an online publication forum, wherein the articles have been extracted from a knowledgebase (KB) based on a support history of the products maintained by the service center; and
- transmitting a personalized page to the mobile device to be displayed at a display of the mobile device, the personalized page listing the one or more registered products associated with the user, wherein each of the registered products is associated with one or more graphical representations, which when activated, transmits a support request to the service center for support services for the associated product.

15. A data processing system, comprising:
- a processor;
- a memory coupled to the processor;
- an application programming interface (API), executed from the memory by the processor, to transmit a plurality of login options for logging into a computer server representing a service center to a mobile device to be resented by a mobile application running within the mobile device, wherein the login options include a media login option using an image or a voice stream and a regular login option using a username and a password, in response to the login options, to receive first media data from a mobile device over a network, the first media data including at least one of an image and a voice stream representing an identity of a user associated with the mobile device, wherein the first media data was captured via at least one of a camera and a voice recorder of the mobile device;
- a security system, executed from the memory by the processor, to authenticate the user by matching the first media data against second media data stored in the service center, wherein the second media data has been previously registered with the service center, wherein the service center provides support services for a plurality of products on behalf of a plurality of product providers, wherein a product provider is one of a retailer, a manufacturer, a distributor, and a service provider associated with the products; and
- a support service system, upon having successfully authenticated the user, to retrieve from a user account associated with the user one or more products that have been registered with the service center, to determine a list of support options available to the user for each of the registered products, wherein the availability of the support options are determined based on a support preference of a client of the corresponding registered product, and to provide support services to the user for a product that has been purchased by the user and registered with the service center by the user, wherein providing support services to the user comprises establishing a communication session between the user via the mobile device and a support agent of the service center using a communications channel that is preferred by the user and is available to the agent, such that the support agent can provide a live support service to the user concerning the registered product.

16. The system of claim 15, wherein the security system is configured to
- cause the mobile device to prompt the user for entering a password; and
- in response to the password received from the mobile device, authenticate the user based on the password.

17. The system of claim 16, wherein the authentication based on the password is performed only if the authentication based on the first media data fails.

18. The system of claim 16, wherein the authentication based on the password is performed only if the authentication based on the first media data is successful.

* * * * *